(12) United States Patent
Pospíšil et al.

(10) Patent No.: US 6,485,295 B1
(45) Date of Patent: Nov. 26, 2002

(54) EQUIPMENT FOR CALCINATION

(75) Inventors: Jaroslav Pospíšil, Přerov (CZ); Josef Žajdlík, Přerov (CZ); Zdeněk Michálek, Přerov (CZ); Petr Krejčí, Přerov (CZ); Alois Pumprla, Přerov (CZ); Alois Sehnálek, Přerov (CZ)

(73) Assignee: PSP Engineering, A.S. (CZ)

( * ) Notice: Subject to any disclaimer, the term of this patent is extended or adjusted under 35 U.S.C. 154(b) by 0 days.

(21) Appl. No.: 10/009,270
(22) PCT Filed: Jun. 8, 2000
(86) PCT No.: PCT/CZ00/00041
§ 371 (c)(1), (2), (4) Date: Dec. 10, 2001
(87) PCT Pub. No.: WO00/76934
PCT Pub. Date: Dec. 21, 2000

(30) Foreign Application Priority Data

Jun. 10, 1999 (CZ) .............................................. 2077-99

(51) Int. Cl.⁷ ................................................. E27B 7/02
(52) U.S. Cl. .............................. 432/14; 432/58; 432/106
(58) Field of Search .............................. 432/14, 15, 58, 432/106; 106/752, 758, 762, 771

(56) References Cited

U.S. PATENT DOCUMENTS 4,425,092 A * 1/1984 Brachthauser et al. ......... 34/93
4,530,661 A * 7/1985 Herchenbach et al. ...... 432/106
5,975,891 A * 11/1999 Hundebol .................... 432/106

* cited by examiner

*Primary Examiner*—Jiping Lu
(74) *Attorney, Agent, or Firm*—Renner, Kenner, Greive, Bobak, Taylor & Weber

(57) ABSTRACT

An equipment for calcination for precalcining of powdered materials before their burning in a sintering equipment is inserted between the last but one cyclone (72) of connected cyclone exchanger (7) and the mixing channel (2), arranged over the input chamber (31) of connected rotary kiln (3) and connected to the input to the last cyclone (71) of cyclone exchanger (7) and it is composed from calcinating chamber (1), which have three parts—a working part (10), to which are connected the at least one air tube (6) and the at least one fuel input (5) and where this working part (10) and/or air tube (6) are further provided with input (4) of powdered material, and the upper part (11), which is provided with at least one interconnecting tube (110) serving for interconnecting with mixing channel (2) and lower part (12), which is provided with a removal tube (120) for interconnecting with the mixing channel (2). There is an input (4) of powdered material into the air tube (6) close to its mouth (600) to the calcinating chamber (1), eventually there is an auxiliary input (41) of powdered material and an auxiliary fuel input (51) additionally added into the air tube (6). Also the mixing channel (2) is advantageously equipped with additional input (42) of powdered material and with it connected additional fuel input (52) and with additional air tube (62).

7 Claims, 3 Drawing Sheets

EQUIPMENT FOR CALCINATION

TECHNICAL FIELD OF THE INVENTION

Figure 1:
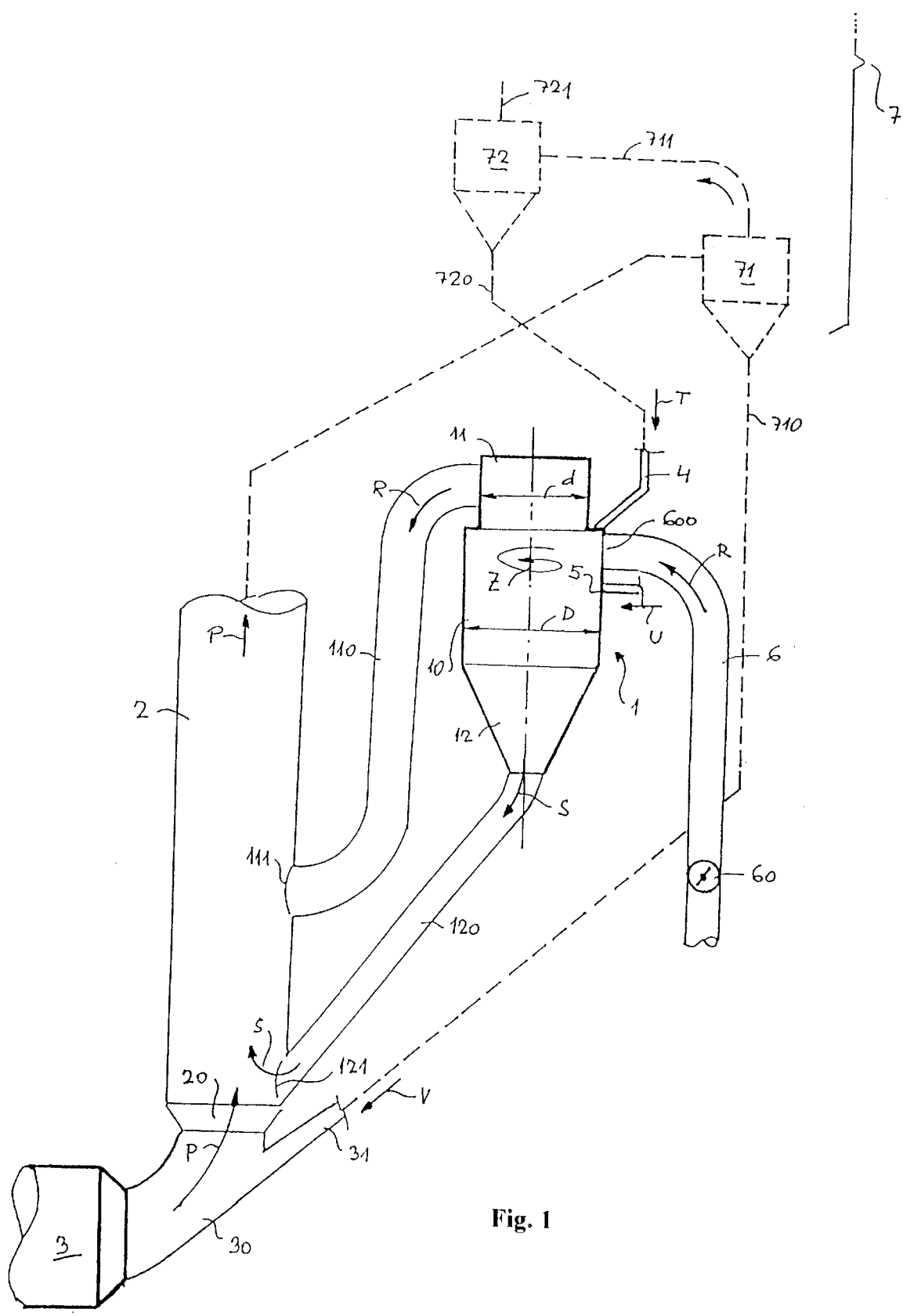

The invention deals with an equipment for calcination for precalcining of powdered materials before their burning in a sintering equipment, namely of cement raw material farina before its burning in a rotary kiln, composed from a calcinating chamber, which is provided with means for input of powdered material and input of fuel with a simultaneous input of burning air and which is interconnected with a mixing channel, which is arranged between the input chamber of rotary kiln and the last cyclone of cyclone heat exchanger which is arranged before the rotary kiln.

THE PRIOR ART

Recently the material at a lot of used equipment with calcinating chambers for calcination of powdered materials, for instance of cement raw material farina, led usually to the lower part of calcinating chamber. To this area also the hot gases from one or more heat sources are led, for instance for clinker cooler, or from the rotary kiln. The powdered material is by the influence of the entering gases kinetic energy dispersed to the volume of calcinating chamber, whereas the desired endothermic reactions—as for instance the dissociation of calcium carbonate—of the powdered material components are running at mixing of powdered material with the added fuel and burning air, or at mixing with the entering hot exhaust gases, The mixture of gases and of powdered material eventually also of particles of unburned fuel then flows upwards the calcinating chamber and it is led with a tube to a channel located between the rotary kiln and the lower cyclone of on after the kiln connected heat exchanger. In this channel then the finishing of the phase of thermal process for powdered material preparation before its entering into the rotary kiln.

The disadvantage of such type of calcinating equipment is the relatively high pressure energy loss of entering gases, caused by the necessity of sometimes multifold lifting of powdered material, especially in case when in the calcinating chamber a greater amount of material is retained, as it would be necessary for the desired calcination level. At not perfect adjusting of operational parameters there it appears additionally a falling down of entering powdered material downwards and subsequently directly into the rotary kiln, without passing the thermal process in the calcinating chamber.

There are known construction versions of calcinating chambers at which the powdered material and also the hot burning air with the fuel are led into the upper part of calcinating chamber. The arising mixture is then flowing downwards and from the bottom part of calcinating chamber is then it is transported through the tube into the gas channel, which connects the rotary kiln, respectively its input chamber with the lower cyclone of the to the chamber antecedent system of cyclone heat exchanger. But the powdered material at this construction version has not an other possibility, as to fall in direction of the gravitation forces that means downwards. So the time of staying of powdered material in the calcinating chamber of this type is relatively short, what deteriorates the possibility of its thermal processing that means the level of calcination. The effort for intensive swirling of powdered material leads additionally to increase of the pressure loss of hot burning air, which is led into the calcinating chamber for instance from the following clinker cooler.

The mentioned disadvantages have as consequence the worsening of technological process effectiveness and the increasing of investment and operation costs for unit of production.

THE AIM OF THE INVENTION

The above mentioned disadvantages of construction solutions are in a considerable extent decreased by the object of this invention, which is a calcinating equipment for precalcination of powdered materials before their burning in a sintering equipment, namely cement raw material farina before burning in rotary kiln, composed from a calcinating chamber provided with means for input of powdered material and input of fuel with simultaneous input of burning air and where it is connected with the mixing chamber, which is arranged between the input chamber of rotary kiln and the last cyclone of cyclone heat exchanger which is arranged before the rotary kiln.

The essence of the invention is that the calcinating chamber is connected to the mixing channel one the one hand with aid of the removing tube arranged in its lower part and on the other hand with at least one interconnecting tube, which is led out from its upper part, whereas the air tube for input of burning air is connected to the middle—working part of calcinating chamber, where this working part and/or the air tube are further provided with at least one input of powdered material and an input of fuel, whereas the working pail, the upper and lower part of calcinating chamber are advantageously coaxial.

An other essence of the invention is that the all parts of calcinating chamber have a circle cross-section, whereas the diameter of calcinating chamber upper part is lesser as the diameter of its working part.

The essence of the invention is also, that the mouth of removing tube is ended into the mixing channel closer to its lower part as the mouth of interconnecting tube.

An other essence of the invention is that into the air tube a regulating member is inserted eventually that into the air tube before its mouth into the calcinating chamber an auxiliary input of powdered material and an auxiliary fuel input are inserted.

At the and the essence of the invention is that the mixing channel is provided with additional input of powdered material, with additional fuel input and with an additional air input.

Using a construction according to the invention a better efficiency of calcinating equipment in whole is achieved and this at a lesser energy consumption. This is then manifested in decreasing investment and operation costs to unit of production.

OVERVIEW OF THE FIGS. ON THE DRAWINGS

Figure 2:
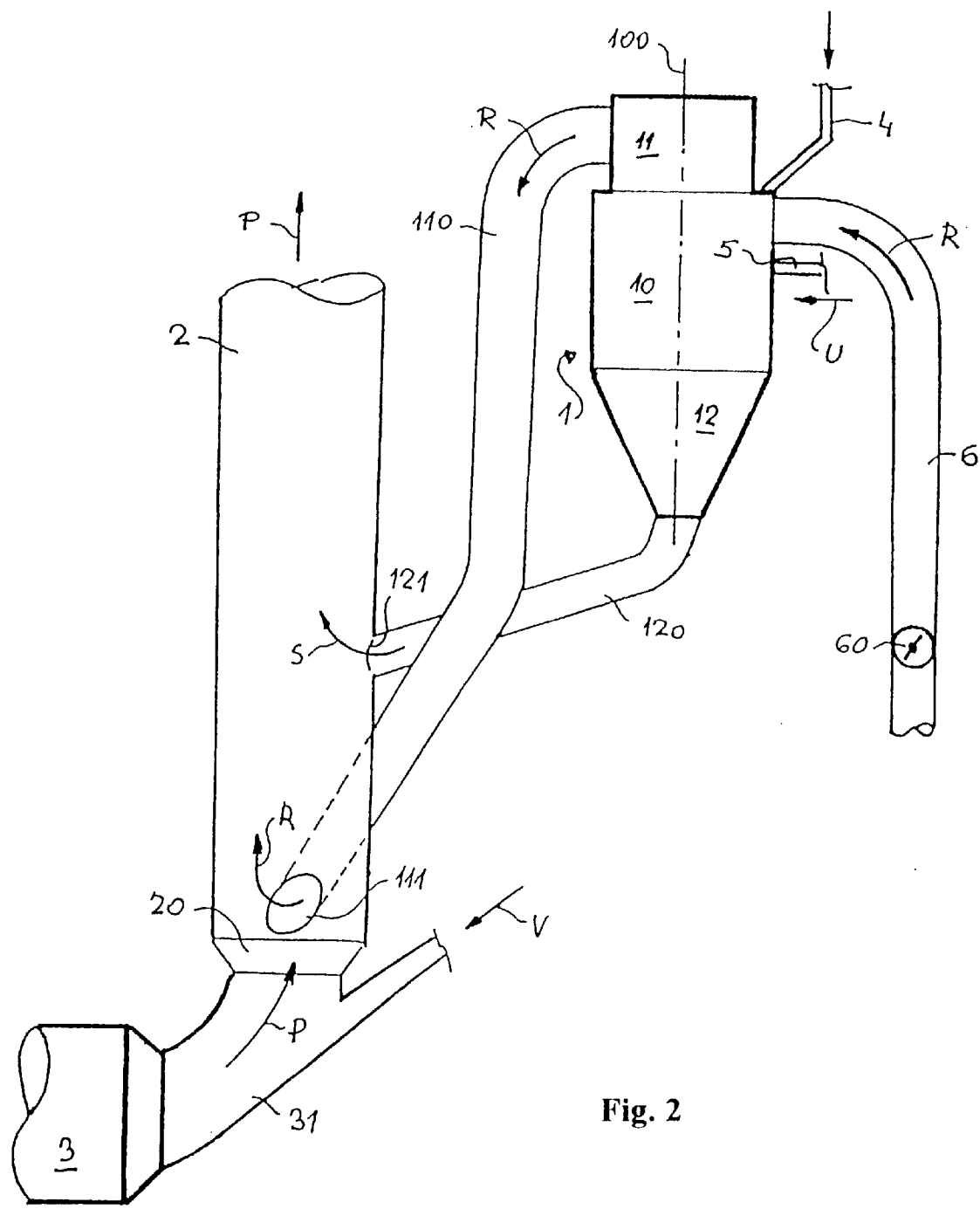
Figure 3:
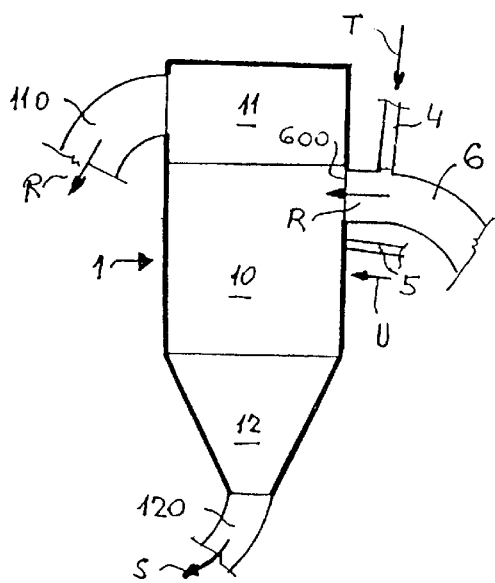
Figure 4:
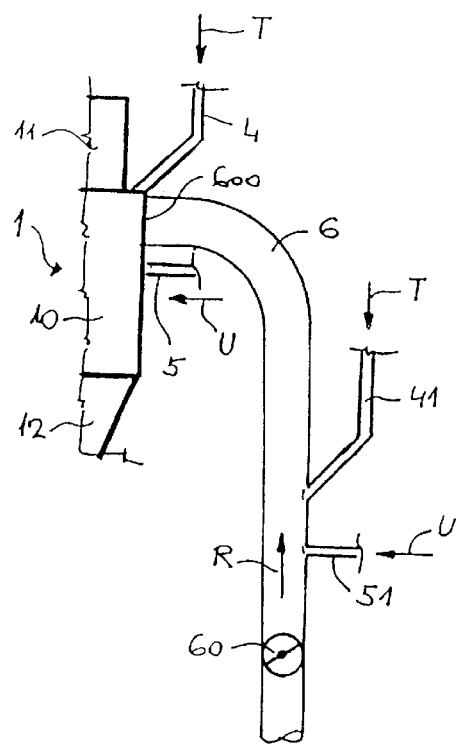
Figure 5:
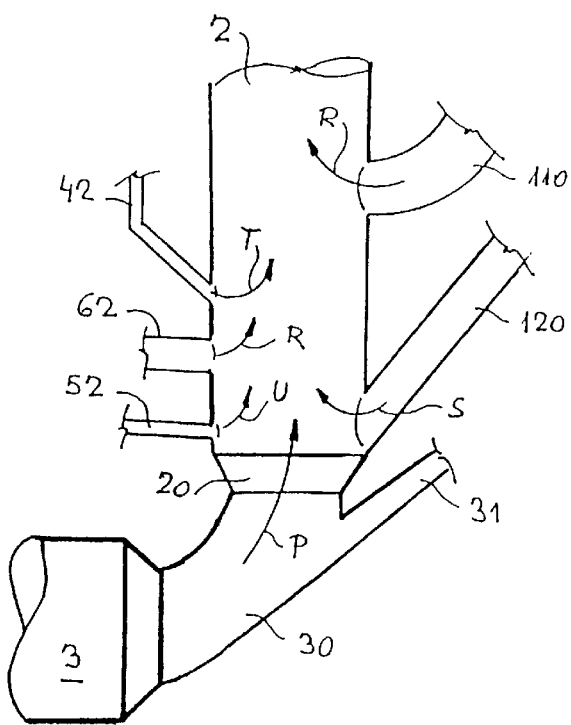

The example embodiments of the object of invention are schematically shown on the attached drawings, where on the FIG. 1 the basic conception of the calcinating equipment according to the invention is demonstrated, on the FIG. 2 an advantageous version of connection of calcinating chamber to mixing channel, on the FIG. 3 a version of calcinating chamber construction and the ending of powdered material input are shown, on the FIG. 4 an adaptation of the solution of the input air tube of calcinating chamber is shown and on the FIG. 5 the adaptation of with the calcinating equipment connected mixing channel is shown.

EXAMPLE OF EMBODIMENT OF THE INVENTION

The calcinating equipment according to the invention demonstrated on the FIG. 1 in an example embodiment is a part of a technological unit, which is composed from one the one hand a rotary kiln 3 with input chamber 30 and input tube 31 of powdered material and on the other hand from a cyclone type exchanger 7, which is designed for preheating of powdered material processed subsequently in rotary kiln 3 where the preheater lower part is shown on the FIG. 1 with dash line. On this FIG. the two lowest cyclones are shown in dash lines, and this the last cyclone 71 with the output tube 710 of powdered material and with the removal tube 711 of hot gas and the last but one cyclone 72 with the output tube 720 of powdered material and with the removal tube 721 of hot gas. The last cyclone 71 and the last but one cyclone 72 are mutually interconnected with the removal tube 711.

As it is shown on the FIG. 1, the calcinating chamber 1 according to the invention is composed from a middle position cylindrical working part 10, a cylindrical upper part 11, which diameter d is lesser then the diameter D of working part 10 and from a conical lower part 12, the most strait end of which is ended to the removal tube 120. All these parts are laying on a common vertical axis 100. It is evident, that the axis 100 of calcinating chamber 1 could be declined from vertical direction without influence to the essence of the invention.

Into the working part 10 of calcinating chamber 1 the air tube 6 with its mouth 600 and with the regulation member 60, for instance a clack valve is ended. Further to these area is led from upwards the input 4 of calcined powdered material, where this input is connected to the output tube 720 of the last but one cyclone 72. Further in the area of mouth 600 the fuel input 5 is ended into the working part 10. The connection of air tube 6 is advantageously realized tangentially, whereas the air input can be in other versions also realized with more tubes 6, the mouths 600 of which are positioned on the circumference of working part 10, and this also in mutually different heights. In such case it is at each from the individual mouths 600, or advantageously between them, an independent fuel input 5 is located, eventually also an independent input 4 of powdered material. The input 4 of powdered material can be also led into the ending part of air tube 6, as it is shown in dashed lines on the FIG. 1, eventually it can be simultaneously led both to the working part 10 of calcinating chamber 1, and to the ending part of air tube 6. The detailed construction of individual inputs and their ending are not fundamental for the object of invention and therefore they are not described in details.

As it is evident from the FIG. 1, the input chamber 30 is from above ended into the lower part 20 of mixing channel 2, to which is ended further both the removal tube 120 of the calcinating chamber 1 lower part 12, and the interconnecting tube 110 of its upper part 11. The mixing channel 2 is interconnected with the last cyclone 71 of the cyclone preheater 7.

An advantageous embodiment according to FIG. 2 corresponds essentially to arrangement according to FIG. 1 with difference, that the locations of mouth 111 of interconnecting tube 110 and the mouth 121 of removal tube 120 into the mixing channel 2 are mutually replaced in height.

On the FIG. 3 an other construction version of embodiment of calcinating chamber 1, which differs from the previous embodiments so, that its working part 10 and upper part 11 have the same diameter, whereas the input 4 of powdered material is led to the air tube 6, and this immediately before its mouth 600 into the working part 10. The cross-section of calcinating chamber 1, and its individual parts—of working part 10, of upper part 11 and lower part 12 respectively—have not to be circular. Without influence to the essence of the invention they can be of oval shaped or eventually angular, advantageously multiangular.

In the arrangement according to FIG. 4 the air tube 6 according to FIG. 1 completed in the upper part with an auxiliary input 41 of powdered material and to it assigned auxiliary fuel input 51, and in the arrangement according to FIG. 5 it is similarly the lower part 20 of mixing channel 2 according to FIG. 1 completed with an additional input 42 of powdered material, with additional fuel input 52 and with additional air tube 62.

The function of calcinating chamber according to the invention is the following. The powdered material, preheated in the cyclone heat exchanger 7, is led from the last but one cyclone 72 through output tube 720 and subsequently in direction of arrow T through the input 4 into the upper area of working part 10 of calcinating chamber 10 and this near the mouth 600 of air tube 6, eventually also according to FIG. 3 into the ending part of air tube 6, or same time to the both places. The powdered material is here spread out with the combustion air stream, which overflow is advantageously adjusted by the regulation member 60 and in the same time mixed with the burning fuel, which is fed in direction of the arrow U with the fuel tube 5.

Passing the thermal process, to which contributes at advantageous tangential arrangement of air tube 6 input the rotational movement in direction of the arrow T, a part of precalcined material—eventually with a part of combustion products—is falling into the lower part 12 of calcinating chamber 1 and then is led out through the removal tube 120 in direction of the arrow S into the lower part 20 of mixing channel 2. Subsequently it is then wafted with the hot gas stream, where the gases are flowing out from the rotary kiln 3 in direction of arrow P into the last cyclone 71 and this way it is returned back into the last stage of preheating process. The remaining—mostly the less weighing—part of precalcined powdered material is then with the exhaust gases transported into the upper part 11 of calcinating chamber 1, from here then through the interconnecting tube 110 is transported in direction of arrow R into the mixing channel 2 and it is returned similarly to the previous part into the ending stage of preheating process. The division to the both mentioned parts of precalcined powdered material, which leave the calcinating chamber 1 according to the invention, and also the share of connected exhaust gases depends on its internal construction solution, namely on the construction solution of its working part 10 and upper part 11 and on the method of connection of the calcinating chamber 1 to the mixing channel 2. To the necessary division to these two parts contributes according to the invention also the fact that the diameter d of upper calcinating part 11 is chosen lesser as the diameter D of its working part.

The powdered material and the exhaust gases, put in from the calcinating chamber 1 are in the mixing channel 2 mixed gases coming out from the input chamber 30 of rotary kiln 3 in direction of arrow P and after finishing of this part of thermal process they enter into the last cyclone 71 of cyclone exchanger 7. The powdered material is here separated from the gases and continues in direction of arrow V through its removal tube 710 and subsequently enters through the input tube 31 into the input chamber 30 and crossing it to the rotary kiln 3, in which is then finished the required burning process.

For adjustment to an optimal mode of the precalcination process of processed powdered material an auxiliary powdered material can—as a version according to the invention—be added in some parts of the equipment, which is then also additionally thermally processed. For this are advantageously used the auxiliary air input 41 and the auxiliary fuel input 51 in the air tube 6 according to FIG. 4, eventually the additional powdered material input 42, together with the additional fuel input 52 and additional air input through the additional air tube 62 according to FIG. 5.

For optimization of the working regime of precalcination it can be contributed also according to the invention with the choice of the mutual position of the mouth 111 of interconnecting tube 110 and the mouth 121 of removal tube 120 into the mixing channel 2. These mouths have not to be according the example location according to FIGS. 1 and 2 only, but they can be for instance without influence to the essence of the invention angularly turned mutually in the lower part 20 of mixing channel 2.

What is claimed is:

1. A calcinating equipment for precalcination of powdered material before its burning in a sintering equipment, namely cement raw material farina before its burning in a rotary kiln, composed from calcinating chamber, which is provided with means for input of powdered material and input of fuel with a simultaneous input of burning air and which is interconnected with a mixing channel, which is arranged between the input chamber of rotary kiln and the last cyclone of cyclone heat exchanger which is arranged before the rotary kiln, characterized in that the calcinating chamber (1) is connected with the mixing channel (2) both through a removal tube (120), which is arranged in its lower part (12), and through at least one interconnecting tube (110), which is led out from its upper part (11), whereas an air tube (6) for input of burning air is connected to a middle-working part (10) of calcinating chamber (1), whereas the working part (10) and/or the air tube (6) are further equipped with at least one input (4) of powdered material and with a fuel input (5).

2. A calcinating equipment according to the claim 1, characterized in that the working part (10), the upper part (11) and the lower part (12) of calcinating chamber (1) are coaxial.

3. A calcinating equipment according to claim 1, characterised in that all parts of calcinating chamber (1) have a circular cross-section, whereas diameter (d) of said upper part (11) of calcinating chamber (1) is lesser as diameter (D) of said working part (10) of calcinating chamber (1).

4. A calcinating equipment according to claim 1, characterised in that mouth (121) of the removal tube is ended into the mixing channel (2) closer to its lower part (20) as mouth of interconnecting tube (110).

5. A calcinating equipment according to claim 1, characterised in that a regulation member (60) is inserted into the air tube (6).

6. A calcinating equipment according to claim 1, characterised in that an auxiliary input (41) of powdered material and an auxiliary fuel input (51) are added into the air tube (6) before its mouth (600) into the calcinating chamber (1).

7. A calcinating equipment according to claim 1, characterised in that the mixing channel (2) is provided with an additional input (42) of powdered material and an additional fuel input (52).

* * * * *